United States Patent [19]

Alberts et al.

[11] Patent Number: 4,652,386

[45] Date of Patent: Mar. 24, 1987

[54] LUBRICATING OIL PREPARATIONS

[75] Inventors: Heinrich Alberts, Odenthal-Blecker; Siegfried Kussi, Leverkusen; Wolfgang Grape, Cologne; Ottfried Schlak, Leverkusen, all of Fed. Rep. of Germany

[73] Assignee: Bayer Aktiengesellschaft, Leverkusen, Fed. Rep. of Germany

[21] Appl. No.: 775,847

[22] Filed: Sep. 13, 1985

[30] Foreign Application Priority Data

Oct. 3, 1984 [DE] Fed. Rep. of Germany ....... 3436164

[51] Int. Cl.⁴ ................ C10M 125/26; C10M 155/02; C07F 7/08
[52] U.S. Cl. .................................... 252/49.6; 252/42.7; 556/450; 556/453
[58] Field of Search ........................... 252/49.6, 42.7; 556/450, 453, 401; 369/286

[56] References Cited

U.S. PATENT DOCUMENTS

| | | | |
|---|---|---|---|
| 2,410,346 | 10/1946 | Hyde | 556/450 |
| 3,096,303 | 7/1963 | Caprino et al. | 556/453 |
| 3,664,985 | 5/1972 | Britt et al. | 252/49.6 |
| 3,816,313 | 6/1974 | Zieleit | 252/49.6 |
| 4,008,346 | 2/1977 | Moeller | 556/450 |
| 4,059,534 | 11/1977 | Morro et al. | 252/49.6 |
| 4,230,632 | 10/1980 | Chapman | 556/453 |
| 4,275,101 | 6/1981 | Wang et al. | 369/286 |

FOREIGN PATENT DOCUMENTS

| | | |
|---|---|---|
| 1276269 | 8/1968 | Fed. Rep. of Germany . |
| 1806445 | 6/1969 | Fed. Rep. of Germany . |
| 1452303 | 10/1965 | France . |
| 1461931 | 12/1965 | France . |

*Primary Examiner*—William R. Dixon, Jr.
*Assistant Examiner*—E. M. McAvoy
*Attorney, Agent, or Firm*—Sprung, Horn, Kramer & Woods

[57] ABSTRACT

Organopolysiloxanes of the formula

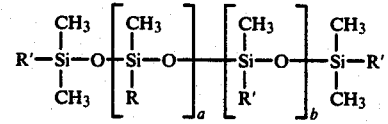

in which
R is an alkyl radical having 6 to 18 C atoms,
R' is an alkyl radical having 1 to 7 C atoms or the phenyl radical,
a and b each independently is an integer from 1 to 500, the ratio of b:a being at least 2, are miscible with mineral oil and synthetic lubricating oils and have a pour point below −15° C.

3 Claims, No Drawings

LUBRICATING OIL PREPARATIONS

The present invention relates to primary oils for lubricating oil preparations based on organo-modifield polysiloxanes, in which the additives conventionally used with lubricants based on mineral oils for improving the lubricating film stability and the ageing behavior and for reducing corrosion are soluble. The present invention also relates to mixtures of these organopolysiloxanes with mineral or synthetic lubrication oils and to the use of such mixtures in applications where the viscosity-temperature behavior and the heat/oxidation stability of pure mineral oils are unsatisfactory.

The industrially known organopolysiloxanes of the general formula 1

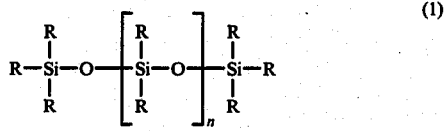

wherein
R=CH$_3$, phenyl or trifluoropropyl and
n=10–5000 or higher,
are only of restricted use as lubricating oils because of their poor lubricating film stability, as demonstrated in the behabior of these silicone oils in the Almen-Wieland machine (M. Brunner and R. Pedrini, Schweizer Archiv, Annales Suisses, 21 (1955), No. 6, pages 169–177; 21 (1955), No. 8, pages 251–257) or in the Reichert friction wear tester (E. Kadmer and H. Danninger, Schmierungstechnik, 7 (1960), No. 5, pages 223–228).

On the other hand, the small change in viscosity as a function of temperature and the high oxidation and heat stability are advantageous compared with mineral lubricants.

The friction behavior of lubricating oils in the Almen-Wieland or Reichert friction wear test can generally be improved by incorporating additives such as zinc dialkyl-dithio-phosphates, sulphurized vegetable fatty acid esters, and the like, but, although the commercially available additives are soluble in mineral oils, they are insoluble in polysiloxanes of the formula 1. Turbidity and incompatibility therefore occur.

Furthermore, pure polydimethylsiloxanes are immiscible with paraffin oils or other mineral or synthetic-oils.

U.S. Pat. No. 4,059,534 describes hydrocarbon/silicone oil mixtures as lubricant systems preferentially used in the low temperature range. The hydrocarbons used do not exceed a particular viscosity (40,000 mm$^2$/s at −65° F.) and have particular branching characteristics. Hydrocarbons of higher viscosity are immiscible with the silicone oils mentioned in U.S. Pat. No. 4,059,534. The mixtures claimed still have to be treated with antiwear additives, which are usually insoluble in silicone oils.

Also, U.S. Pat. No. 3,816,313 describes the use of alkoxysiloxanes which are soluble in mineral oils because of their long-chain alkyl radicals in the alkoxy group. The alkoxysiloxane/lubricating oil mixtures claimed have an improved resistance to wear ("mean fatigue life"). In the case of the siloxanes described in the said U.S. patent, the long-chain alkyl radicals are bonded to the siloxane chain via SiOC bonds. Due to the sensitivity of such systems to hydrolysis, this is less preferable than SiC-bonded alkyl radicals.

French Pat. No. 1,425,564 describes a process for the preparation of long-chain alkyl-substituted organopolysiloxanes by the platinum-catalyzed addition of olefins onto an organopolysiloxane containing SiH groups. The reaction products are soluble in mineral oils and act as anticorrosive agents for the alkylpolysiloxane/mineral oil mixture, especially if they still contain free SiH groups.

The organopolysiloxanes described in French Pat. No. 1,425,564 correspond to the general formula 2

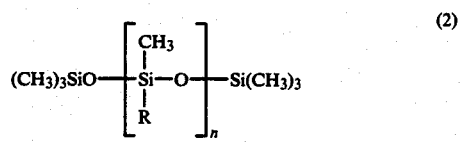

wherein
R=long-chain alkyl radical,
i.e. they contain a long-chain alkyl radical on every Si atom in the chain. Although these products are miscible with mineral oils, they have the disadvantage of possessing a relatively high solidification point (hereafter called "pour point" according to DIN 51 583), which in fact is in the region of 0° C. Thus, although these compounds can be used in a mixture with mineral oils, their general application as lubricating oils is considerably restricted.

The object of the present invention was therefore to provide organo-modified polysiloxanes which on the one hand could be used on their own as lubricating oils and on the other hand could also be mixed with mineral oils of very different origins. Commercially available lubricating oil additives should also be soluble in these silicone oils. The prerequisites for this were firstly an adequate silicone character so that a pour point below −15° C. was achieved, which is regarded as necessary for the silicone oil to be used as a primary oil for lubricant formulations, and secondly a certain alkyl character so that not only mineral oils of very different origins but also additives conventionally used for lubricating oils were miscible with the silicone oil.

The present invention thus relates to organopolysiloxanes of the general formula 3

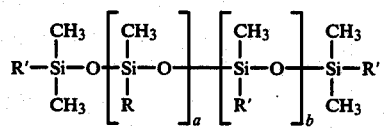

wherein
R represents a straight-chain alkyl radical having 6 to 18 C atoms or a branched alkyl radical having 6 to 16 C atoms,
R' denotes straight-chain or branched alkyl radicals having 1 to 7 C atoms or the phenyl radical and
a and b denote integers from 1 to 500, the ratio b:a being greater than 2,
which are miscible with mineral oils and have a pour point (according to DIN 51 583) below −15° C.

According to the invention, such lubricating oil systems comprise organopolysiloxane-based polymeric products which consist essentially of units of the following general formulae:

(a) units of the general formula

wherein
R denotes straight-chain alkyl radicals having 6 to 18 C atoms, preferably 10 to 14 C atoms, or branched alkyl radicals having 6 to 16 C atoms, preferably 6 to 10 C atoms,
and
(b) units of the general formula

wherein
R' denotes straight-chain or branched alkyl radicals having 1 to 7 C atoms or the phenyl radical,
and
(c) units of the general formula

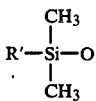

wherein
R and R' have the meanings given above.

The ratio of the units b to the units a is equal to two or greater than two in every case. The preferred ratio b/a is between 2 and 10. Preferred compounds are those which contain 1 to 225 units a and 9 to 450 units b. The total chain length, which is determined by the content of c, is between 10 and 700 silicone units.

Examples of straight-chain radicals R are hexyl, octyl, nonyl, decyl, dodecyl and tetradecyl radicals. However, R can also be a branched alkyl radical. Examples of branched alkyl radicals are 3-methylpentyl, 2,3-dimethylbutyl, 3-butylhexyl and 4-propyloctyl radicals. Particularly preferred alkyl radicals R and the dodecyl radical and the tetradecyl radicals, also especially mixtures of the two. Examples of straight-chain alkyl radicals R' are methyl, ethyl, propyl, hexyl and heptyl radicals. Examples of branched alkyl radicals R' are isobutyl, 2-methylbutyl and 2,2-dimethylpropyl radicals. R' can also denote the phenyl radical. However; R' is preferably methyl.

Compared with the classical organopolysiloxanes of the formula 1, the organopolysiloxanes according to the invention have a drastically improved lubricating film stability. Surprisingly, it has been found that their mixtures with mineral or synthetic lubricating oils also have improved lubricating film stability and dissolve a sufficient quantity of commercially available additives for improving the lubricating film, such as zinc 2-ethylhexyldithiophosphate or sulphurized vegetable fatty acid esters, to give a clear solution.

The invention further relates to mixtures of
(1) 0.1 to 75% by weight, preferably 1 to 30% by weight, of the organopolysiloxane component according to the invention, and (2) 99.9 to 25% by weight, preferably 99 to 70% by weight of a mineral or synthetic lubricating oil.

The organopolysiloxanes used according to the invention, or their mixtures with mineral or synthetic lubricating oils, can contain additives such as colorants, pour point depressants, antiwear agents, anticorrosive agents, antioxidants and dispersants or detergents.

The organopolysiloxanes according to the invention can be prepared, for example, in the following manner:
1.
(a) Pt-catalyzed addition of α-olefins onto $CH_3SiHCl_2$ and
(b) equilibration, under the catalytic action of an acid ($C_4F_9SO_3H$, $H_2SO$), with $(CH_2)_2SiO$ and $(CH_3)_3SiO_{1/2}$ units, or 2.
(a) Preparation of an oil of the general formula 4

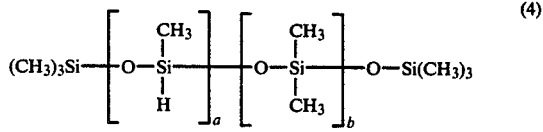

and
(b) Pt-catalyzed addition of α-olefins onto the SiH-containing oil.

α-Olefins having 6 to 18 C atoms, preferably those having 10–14 C atoms, are suitable for the addition reaction. The appropriate α-olefins have a linear or branched chain. Reactions of this type are known per se and are described, for example, in W. Noll, Chemie and Technologie der Silicone (Chemistry and Technology of Silicone), 2nd edition, 1968, page 48.

Examples 1–10 which follow verify the good miscibility of the organopolysiloxanes according to the invention with mineral oils such as purely paraffinic oils as well as mixed based mineral oils (paraffins plus naphthenes) and purely naphthenic oils. Moreover, the new organopolysiloxanes are also readily soluble in synthetic base fluids for lubricants, such as dicarboxylic acid esters and neopolyol esters (cf. Table 1).

Furthermore, it has been found that not only the organo-modified polysiloxanes themselves (compared with organopolysiloxanes currently known in industry) but also mixtures of the new products with mineral oils (compared with pure mineral oils) lead to greatly improved frictional behavior—higher lubricating oil stability and better wear protection (Table 2).

The organopolysiloxanes according to the invention are also very readily soluble in synthetic base liquids used for the formulation of fully and partially synthetic lubricants, such as 2-ethylhexyl adipate, trimethylolpropane tripelargonate or pentaerythritol tetrapelargonate.

Furthermore, it has been found that a number of lubricant additives commercially available for mineral oils, for example antiwear/extreme pressure additives, corrosion inhibitors, antioxidants and the like, are readily soluble in sufficient proportions in the new organopolysiloxanes, the incorporation of such additive combinations making it possible to improve the frictional and wear behavior, the heat/oxidation stability and the corrosive protection of organopolysiloxane-containing formulations to the level of high-alloy mineral gear lubricating oils (Table 3).

On mixing the new organopolysiloxanes with mineral oils, it was found that not only the frictional behavior of the mineral primary oils is drastically improved (Table 4).

The tables which follow are intended to illustrate in greater detail the properties of the polysiloxanes according to the invention and of their mixtures with mineral oils.

Compositions of the silicone oils according to the invention listed in the tables

| Product No. | Average composition | Pour points of the oils in the examples | R |
|---|---|---|---|
| 1 | $MD_{20}D'_5M'$ | −36 | $C_{12}H_{25}/C_{14}H_{29}$ mixture (approx. 70% of $C_{12}H_{25}$) |
| 2 | $MD_{12.5}D'_{5.5}M'$ | −16 | $C_{12}H_{25}/C_{14}H_{29}$ mixture |
| 3 | $MD_{12.5}D'_{5.5}M'$ | −60 | $C_8H_{17}$ |
| 4 | $MD_{12.5}D'_{5.5}M'$ | −56 | $C_{10}H_{21}$ |
| 5 | $MD_{20}D'_5M'$ | −40 | $C_{14}H_{29}$ |
| 6 | $MD_{200}D'_{50}M'$ | −20 | $C_{12}H_{25}/C_{14}H_{29}$ mixture |
| 7 | $MD_{120}D'_{60}M'$ | −18 | $C_{12}H_{25}/C_{14}H_{29}$ mixture |
| 8 | $MD_{160}D'_{80}M'$ | −15 | $C_{12}H_{25}/C_{14}H_{29}$ mixture |
| 9 | $MD_{10}D'_{2.5}M'$ | −15 | $C_{12}H_{25}/C_{14}H_{29}$ mixture |
| 10 | $MD_{120}D'_{30}M'$ | −18 | $C_{12}H_{25}/C_{14}H_{29}$ mixture | where

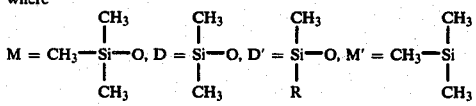

The polysiloxanes were prepared in the following manner (illustrated by means of products nos. 2 and 9). Product 2: Preparation of a modified silicone oil of the type

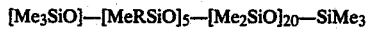

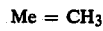

A mixture of 43.26 parts of octamethylcyclotetrasiloxane, 3.94 parts of hexamethyldisiloxane and 9.56 parts of an SiH-containing silicone oil of the composition

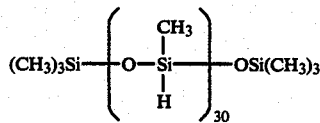

is placed in the reaction vessel and treated with 0.12 part of a mixture of perfluorobutanesulphonic acid and sulphuric acid (weight ratio 1:1). The mixture is stirred for 20 hours at room temperature.

The mixture is neutralized by adding 0.6 part of zinc oxide. The oil is then filtered and freed of the low-boiling components by heating to a bottom temperature of 150° C. at a pressure of 0.5 mbar.

50 parts of the resulting oil are treated with a mixture of 0.15 part of a Pt catalyst containing 1% of Pt and 0.225 part of an α-olefin mixture of $C_{12}H_{24}$ and $C_{14}H_{28}$ (ratio 2:1). The resulting mixture is then heated to 120°; at this temperature, 36.3 parts of the olefin mixture are added dropwise over a period of 3 hours. After three-quarters of the quantity of olefin has been added, after-catalysis is carried out by adding 0.075 part of Pt catalyst and 0.12 part of olefin mixture. After the addition has ended, the resulting mixture is stirred for a further 3 hours. It is then heated to a bottom temperature of 150° at a pressure of 1 mbar.

This gives 75 parts of a silicone oil having the following characteristics:
Viscosity: 98.9 mm²/s at 20° C.
Density: 0.926 g/cm³ at 20° C.
Flash point: 146° according to DIN 51758.

The $^1$H-NMR spectrum shows a 1:1 intensity ratio of Si-methyl/Si-higher alkyl groups.

Product 9: Preparation of a modified silicone oil of the type

14 parts of a methylalkyldichlorosilane mixture, which has been obtained by the platinum-catalyzed addition of $MeHSiCl_2$ onto an α-olefin mixture containing 63% by weight of C-12 olefin and 37% by weight of C-14 olefin, are placed in a three-necked round-bottomed flask equipped with a stirrer, a thermometer, a dropping funnel and a reflux condenser or a distillation attachment.

14 parts of octamethylcyclotetrasiloxane, 0.013 part of $C_4F_9SO_3H$ and 0.030 part of concentrated sulphuric acid are added. The resulting mixture is heated to 60° C. and a mixture of 0.75 part of water and 1.10 parts of glacial acetic acid is added over a period of 4 hours, the HCl gas formed being led away, 3 parts of hexamethyldisiloxane are then added, the mixture is then heated to 90° C. and stirred for 4 hours at this temperature a further 0.165 part of water is added, the mixture is distilled to a bottom temperature of 120° C., 0.38 part of sodium acetate is added, the pressure is reduced, the mixture is distilled to a bottom temperature of 130° C. at 20–30 mbar, the distillation receiver is changed, 0.38 part of bicarbonate is added and the mixture is heated to 160° C. at a pressure of 1 mbar. After cooling and filtration, 23 parts of silicone oil having the following characteristics are obtained:
Viscosity: 30 mPas at 23° C.;
Solids content: 99% (according to DIN 53182);
Density: 0.920 g/cm³ at 23° C.

The oil is brownish yellow and neutral and has a flash point of 240° C. The $^1$H-NMR spectrum shows a 1.2:1.0 intensity ratio of the Si-methyl/si-higher alkyl groups.

TABLE 1

| | | | Miscibility with commercially available mineral primary oils | | | | | |
|---|---|---|---|---|---|---|---|---|
| | | | (a) Paraffinic primary oil type, soluble in the temp. range | | (b) Mixed based primary oil type, soluble in the temp. range | | (c) Naphthenic primary oil type, soluble in the temp. range | |
| Ex. No. | % by weight of polysiloxane | % by weight of primary oil | from °C. | to °C. | from °C. | to °C. | from °C. | to °C. |
| 1 | 25 | 75 | −10 | >200 | −9 | >200 | <−60 | >200 |
| | 50 | 50 | −11 | >200 | −11 | >200 | −57 | >200 |
| | 75 | 25 | −13 | >200 | >+25 | >200 | −50 | >200 |
| 2 | 25 | 75 | −15 | >200 | −10 | >200 | −30 | >200 |
| | 50 | 50 | −16 | >200 | −11 | >200 | −24 | >200 |

TABLE 1-continued

| | | | Miscibility with commercially available mineral primary oils | | | | | |
|---|---|---|---|---|---|---|---|---|
| | | | (a) Paraffinic primary oil type, soluble in the temp. range | | (b) Mixed based primary oil type, soluble in the temp. range | | (c) Naphthenic primary oil type, soluble in the temp. range | |
| Ex. No. | % by weight of poly siloxane | % by weight of primary oil | from °C. | to °C. | from °C. | to °C. | from °C. | to °C. |
| | 75 | 25 | −26 | >200 | −21 | >200 | −22 | >200 |
| 3 | 25 | 75 | −11 | >200 | +1 | >200 | <−60 | >200 |
| | 50 | 50 | −10 | >200 | >+25 | >200 | <−60 | >200 |
| | 75 | 25 | −12 | >200 | >+25 | >200 | <−60 | >200 |
| 4 | 25 | 75 | −10 | >200 | −8 | >200 | <−60 | >200 |
| | 50 | 50 | −11 | >200 | −9 | >200 | <−60 | >200 |
| | 75 | 25 | −13 | >200 | <+25 | >200 | <−60 | >200 |
| 5 | 25 | 75 | −10 | >200 | −7 | >200 | <−60 | >200 |
| | 50 | 50 | −9 | >200 | −8 | >200 | <−60 | >200 |
| | 75 | 25 | −11 | >200 | >+25 | >200 | <−60 | >200 |
| 6 | 25 | 75 | −11 | >200 | +1 | >200 | −38 | >200 |
| | 50 | 50 | +20 | >200 | >+25 | >200 | −39 | >200 |
| | 75 | 25 | −21 | >200 | >+25 | >200 | −41 | >200 |
| 7 | 25 | 75 | −24 | >200 | −18 | >200 | −34 | >200 |
| | 50 | 50 | −22 | >200 | −8 | >200 | −30 | >200 |
| | 75 | 25 | −19 | >200 | >+25 | >200 | −18 | >200 |
| 8 | 25 | 75 | −22 | >200 | −17 | >200 | −38 | >200 |
| | 50 | 50 | −23 | >200 | −9 | >200 | −32 | >200 |
| | 75 | 25 | −25 | >200 | >+25 | >200 | −28 | >200 |
| 9 | 25 | 75 | −20 | >200 | −14 | >200 | −48 | >200 |
| | 50 | 50 | −20 | >200 | −12 | >200 | −45 | >200 |
| | 75 | 25 | −22 | >200 | <+25 | >200 | −28 | >200 |
| 10 | 25 | 75 | −12 | >200 | −8 | >200 | −45 | >200 |
| | 50 | 50 | −15 | >200 | >+25 | >200 | −31 | >200 |
| | 75 | 25 | −21 | >200 | >+25 | >200 | −28 | >200 |

TABLE 2

Friction behavior in mixture with a mixed based mineral primary oil

The test mixtures were examined in the Reichert friction wear tester (E. Kadmer and H. Danninger, Schmierungstechnik, vol. 7 (1960), No. 5, pages 223-228) and on the Almen-Wieland machine (H. Brunner and R. Pedrini, Schweizer Archiv, Annales Suisses, vol. 21 (1955), No. 6, pages 169-177; vol. 21 (1955), No. 8, pages 251-257), the following values being measured for Examples 2, 6, 7 and 8.

| Ex. No. | % by weight of product in mixed based primary oil | Reichert friction wear test at 15 N Load Specific load-carrying capacity N/mm² | Almen-Wieland test | | |
|---|---|---|---|---|---|
| | | | Welding force N | Friction force N | Temperature °C. |
| — | 0 | 19.2 | 2500 | 550 | 26 |
| 2 | 5 | 13.6 | 4000 | 1900 | 45 |
| | 10 | 15.9 | 4000 | 2500 | 39 |
| | 20 | 19.2 | 4000 | 2300 | 36 |
| 6 | 5 | 16.9 | 4000 | 2000 | 40 |
| | 10 | 18.0 | 4000 | 1900 | 34 |
| | 20 | 21.5 | 10000 | 1434 | 57 |
| 7 | 5 | 16.6 | 3500 | 2050 | 33 |
| | 10 | 20.7 | 4500 | 1900 | 38 |
| | 20 | 25.1 | 6000 | 1100 | 39 |
| 8 | 5 | 15.5 | 3500 | 1900 | 33 |
| | 10 | 17.0 | 4000 | 2150 | 38 |
| | 20 | 21.3 | 6500 | 3500 | 45 |

TABLE 3

Solubility of extreme pressure (EP) and antiwear (AW) additives in the organo-modified polysiloxanes according to the invention.

From the many commercially available EP/AW additives, a zinc dialkyl-dithiophosphate (Additin RC 1529 from Rheinchemie GmbH) and an organic sulphur carrier (40% of S, Additin M 1949 from RCR) were selected for the solubility experiments. Testing in the polysiloxanes according to the invention was carried out by dissolving the additives in the concentrations of 1,2,3,4 and 5% by weight, relevant to the particular application, and it was found, after cooling to 20° C., that the abovementioned additives remain dissolved in the polysiloxanes as a clear solution, even in the long term.

The following experimental results of the Reichert friction wear Almen-Wieland tests verify the excellent activity of these additives on the friction behavior of the organo-modified polysiloxanes according to the invention.

| Organopolysiloxane Additive | 98% according to Example 2 2% of M 1949 (40% of S) | 98% according to Example 2 2% of RC 1529 | 100% according to Example 2 |
|---|---|---|---|
| Reichert Friction wear test (at 15 N load) | | | |

TABLE 3-continued

Solubility of extreme pressure (EP) and antiwear (AW) additives in the organo-modified polysiloxanes according to the invention.

From the many commercially available EP/AW additives, a zinc dialkyl-dithiophosphate (Additin RC 1529 from Rheinchemie GmbH) and an organic sulphur carrier (40% of S, Additin M 1949 from RCR) were selected for the solubility experiments. Testing in the polysiloxanes according to the invention was carried out by dissolving the additives in the concentrations of 1,2,3,4 and 5% by weight, relevant to the particular application, and it was found, after cooling to 20° C., that the abovementioned additives remain dissolved in the polysiloxanes as a clear solution, even in the long term.

The following experimental results of the Reichert friction wear Almen-Wieland tests verify the excellent activity of these additives on the friction behavior of the organo-modified polysiloxanes according to the invention.

| Organopolysiloxane Additive | 98% according to Example 2 2% of M 1949 (40% of S) | 98% according to Example 2 2% of RC 1529 | 100% according to Example 2 |
|---|---|---|---|
| Wear mark mm² | 5.4 | 11.0 | 26.5 |
| Specific load-carrying capacity N/mm² Almen-Wieland test (Values at the critical load) | 55.6 | 27.1 | 11.5 |
| Welding force N | 15000 | 8000 | 4000 |
| Friction force N | 3100 | 1450 | 1800 |
| Temperature °C. | 123 | 58 | 56 |

TABLE 4

Effect of the organo-modified polysiloxanes according to the invention on the viscosity-temperature behavior of a mixed based mineral primary oil

| Example No. | % by weight of polysiloxane | % by weight of primary oil | Viscosity in mm²/S at | | | | Viscosity index VI* |
|---|---|---|---|---|---|---|---|
| | | | 20° C. | 40° C. | 50° C. | 100° C. | |
| | | 100 | 343 | 100 | 61 | 10.8 | 90 |
| 2 | 5 | 95 | 332 | 98 | 61 | 11.5 | 105 |
| | 10 | 90 | 312 | 97 | 60 | 12.0 | 115 |
| | 20 | 80 | 97 | 93.5 | 60 | 12.9 | 135 |
| 6 | 5 | 95 | 377 | 112 | 70 | 13.8 | 122 |
| | 10 | 90 | 404 | 127 | 81 | 16.5 | 140 |
| | 20 | 80 | 475 | 164 | 107 | 24.6 | 182 |
| 7 | 5 | 95 | 371 | 111 | 68.3 | 13.3 | 116 |
| | 10 | 90 | 398 | 125 | 78.4 | 15.7 | 132 |
| | 20 | 80 | 442 | 149 | 96 | 20.8 | 163 |
| 8 | 5 | 95 | 395 | 118 | 73 | 14.1 | 119 |
| | 10 | 90 | 433 | 134 | 84 | 17.0 | 138 |
| | 20 | 80 | 525 | 175 | 113 | 27.7 | 197 |

*The viscosity index expresses the stability of liquid lubricants to temperature changes. The VI is described by Dean and Davis in "Ind. and Eng. Chem.", volume 32, page 104 (1940) and is determined according to ISO Standard 2909.

It will be understood that the specification and examples are illustrative but not limitative of the present invention and that other embodiments within the spirit and scope of the invention will suggest themselves to those skilled in the art.

We claim:

1. An organopolysiloxane miscible with mineral oil, having a pour point below −15° C. and the formula

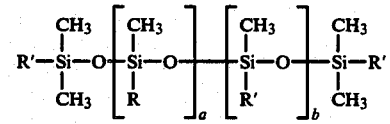

in which
R is an alkyl radical having 6 to 18 C atoms,
R' is a methyl radical or a phenyl radical,
a denotes 1 to 225 and b denotes 9 to 450, the ratio of b:a being at least 2.

2. A lubricating composition comprising a solution of a synthetic and/or mineral lubricating oil and an organopolysiloxane according to claim 1.

3. A composition according to claim 2, by weight comprising 0.1–75% of organopolysiloxane and 25–99% of synthetic and/or mineral oil lubricating oil.

* * * * *

UNITED STATES PATENT AND TRADEMARK OFFICE
CERTIFICATE OF CORRECTION

PATENT NO. : 4,652,386

DATED : March 24, 1987

INVENTOR(S) : Heinrich Alberts, et al.

It is certified that error appears in the above-identified patent and that said Letters Patent is hereby corrected as shown below:

| | |
|---|---|
| Title Page, under U.S. Patent Documents, line 4 | Delete "Zieleit" and substitute --Szieleit-- |
| Col. 3, line 47 | Delete "radicals" and substitute --radical-- |
| Col. 4, line 66 | Delete "corrosive" and substitute --corrosion-- |
| Col. 6, line 11 | Delete "mixture" and substitute --mixtures-- |
| Col. 10, line 62 | Delete "25-99%" and substitute --25-99.9%-- |
| Col. 10, line 62 | After "mineral" delete "oil" |

Signed and Sealed this

Eleventh Day of August, 1987

*Attest:*

DONALD J. QUIGG

*Attesting Officer*   *Commissioner of Patents and Trademarks*